Jan. 24, 1961 R. HIRSCHBERG 2,969,276
METHOD OF CONTROLLING THE CONTINUOUS
PRODUCTION OF CHLORINE DIOXIDE
Filed Feb. 9, 1959
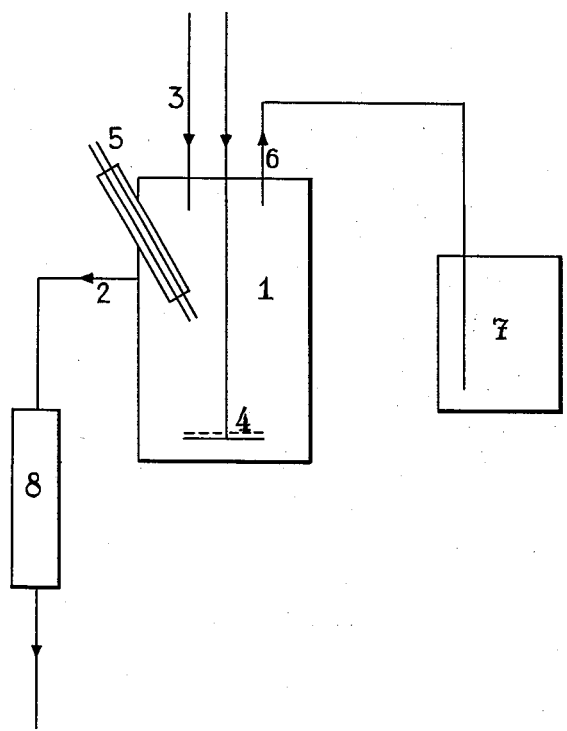
INVENTOR
RUDOLF HIRSCHBERG
BY
ATTORNEYS

United States Patent Office 2,969,276
Patented Jan. 24, 1961

2,969,276

METHOD OF CONTROLLING THE CONTINUOUS PRODUCTION OF CHLORINE DIOXIDE

Rudolf Hirschberg, Frankfurt am Main, Germany, assignor to Farbwerke Hoechst Aktiengesellschaft vormals Meister Lucius & Bruning, Frankfurt am Main, Germany, a corporation of Germany Filed Feb. 9, 1959, Ser. No. 792,031

Claims priority, application Germany Feb. 21, 1958

3 Claims. (Cl. 23—152)

The present invention relates to a method of controlling the continuous production of chlorine dioxide.

It is known that chlorine dioxide can be prepared by reacting sulfur dioxide diluted with an inert gas, for example air, with an acidified solution of an alkali metal chlorate or alkaline earth metal chlorate. It has also been proposed to carry out this process continuously. In this case, for example sodium chlorate or a sodium chlorate solution, sulfuric acid of appropriate concentration and sulfur dioxide diluted with an inert gas are continuously introduced into a reaction vessel that has been heated, advantageously to a temperature in the range of 35° C. to 55° C. The gas mixture evolved which contains substantially chlorine dioxide and a little chlorine is continuously discharged, and a corresponding portion of the solution in the reaction vessel is continuously removed through an overflow.

In order to take the best possible advantage of the chlorate used, it is necessary to fairly exactly balance against one another the amounts of chlorate and sulfur dioxide supplied; when, for example, sulfur dioxide is supplied in an insufficiently great amount, a considerable portion of unused chlorate is removed together with the liquid flowing off continuously, while inversely, when sulfur dioxide is supplied in too great amounts, considerable portions of the chlorate are reduced to chlorine or chloride and so lost for the process. It has been proposed to overcome this disadvantage, for example by conducting the process in a manner such that the amounts of chlorate and sulfur dioxide consumed per unit of time are so balanced against one another that they correspond fairly exactly to a molecular ratio of 2:1. This method implies, however, permanent analytic control apart from other disadvantages which arise from the inevitable lapse of time between taking the sample and obtaining the result of analysis.

I have now found that the continuous production of chlorine dioxide by reacting an alkali metal chlorate or alkaline earth metal chlorate with sulfur dioxide in an acid solution can be controlled by maintaining the redox potential of the reaction solution at between about 1000 and about 1080 millivolts, measured with an electrode combination platinum/saturated calomel electrode.

This improvement enables chlorine dioxide to be produced continuously in an economical and technically satisfactory manner while the disadvantages involved in the known processes are avoided.

The control method disclosed in this invention can be used with special advantage in processes as described above for making chlorine dioxide, wherein the chlorate content in the solution to be used varies within wide limits. There may be employed solutions containing considerable proportions of chlorate or also chlorate solutions that are saturated at the working temperature, for example a solution containing about 25–30% by weight of sodium chlorate at 40° C. There may even be used solutions containing an excess of solid chlorate. Solutions containing less chlorate, for example about 5% by weight of sodium chlorate or even less, which may be especially advantageous, may also be employed.

As chlorates there are mainly used those of sodium, potassium, magnesium and calcium.

The chlorate solutions are advantageously acidified with sulfuric acid or phosphoric acid, an about 1 N–12 N-acid solution being preferred.

Depending on the operating conditions in a given case and the constructional particulars of the chlorine dioxide generator used, the process of this invention may be so modified that the interval of the redox potential is further limited, for example to a potential of between 1030 and 1060 millivolts or even to a potential of between 1035 and 1040 millivolts.

The process may be carried out so that the necessary redox potential is maintained at the desired level by constant supply of chlorate and a corresponding supply of sulfur dioxide. Inversely, the necessary redox potential can be maintained by constant supply of sulfur dioxide and a corresponding measured amount of chlorate.

The process of the invention has proved especially advantageous above all in those cases in which the starting material is a relatively dilute chlorate solution containing, for example less than 5.0% by weight of chlorate. As the throughput of liquid is very high with respect to the amount of chlorate supplied, the liquid which is continuously removed may involve discharge losses of chlorate as high as about 50% of the chlorate supplied. In the process of this invention, the chlorate discharge losses can be reduced to about 10–15%.

In the following the invention is described in greater detail with reference to the accompanying drawing. For example, reaction vessel 1 provided with an outlet 2 is charged per hour through an inlet 3 with 0.84 liter of a 9.7 N-sulfuric acid containing 58 grams of $NaClO_3$ per liter. The temperature in the reaction vessel is 40° C. Through gas distributing device 4 sulfur dioxide diluted with air to a strength of 4% by volume is introduced in an amount such that the voltage measured in the reaction solution with an immersed electrode combination (platinum/saturated calomel electrode) is between 1035 and 1040 millivolts. When the voltage exceeds the interval indicated above, the amount of sulfur dioxide supplied is increased until the measured voltage is again within the range indicated. Inversely, when the voltage in the reaction solution falls below 1035 to 1040 millivolts, the amount of sulfur dioxide supplied is reduced. The gas mixture leaving at 6 which besides chlorine dioxide contains substantially chlorine is introduced at 7 in the usual manner into a sodium peroxide solution. In this solution are obtained per hour 0.38 mol of sodium chlorite (83% calculated on the chlorate used) and 0.015 mol of sodium chloride. 0.82 liter of reaction liquid flow off per hour through overflow 2. The reaction liquid is freed from dissolved chlorine dioxide in blow-off tower 8 and then contains 0.0607 mol chlorine in the form of chloride and chlorate. This corresponds to a chlorate discharge loss of about 13% calculated on the amount of chlorate used.

I claim:

1. In a method of controlling the continuous production of chlorine dioxide by reacting a chlorate with sulfur dioxide in an acid solution, the improvement which comprises maintaining the redox potential of the reaction solution at between 1000 and 1080 millivolts measured with an electrode combination platinum/saturated calomel electrode.

2. The improvement as claimed in claim 1, wherein the necessary redox potential is maintained by constant supply of chlorate and a corresponding supply of sulfur dioxide.

3. The improvement as claimed in claim 1, wherein the necessary redox potential is maintained by constant supply of sulfur dioxide and a corresponding supply of chlorate.

References Cited in the file of this patent

UNITED STATES PATENTS 2,376,935     Persson _____ May 29, 1945

OTHER REFERENCES

Olive et al.: "Chemical Engineering's Guide to Process Instruments," Chemical Engineering, June 1957, pages 302 and 303.